Figure 1:
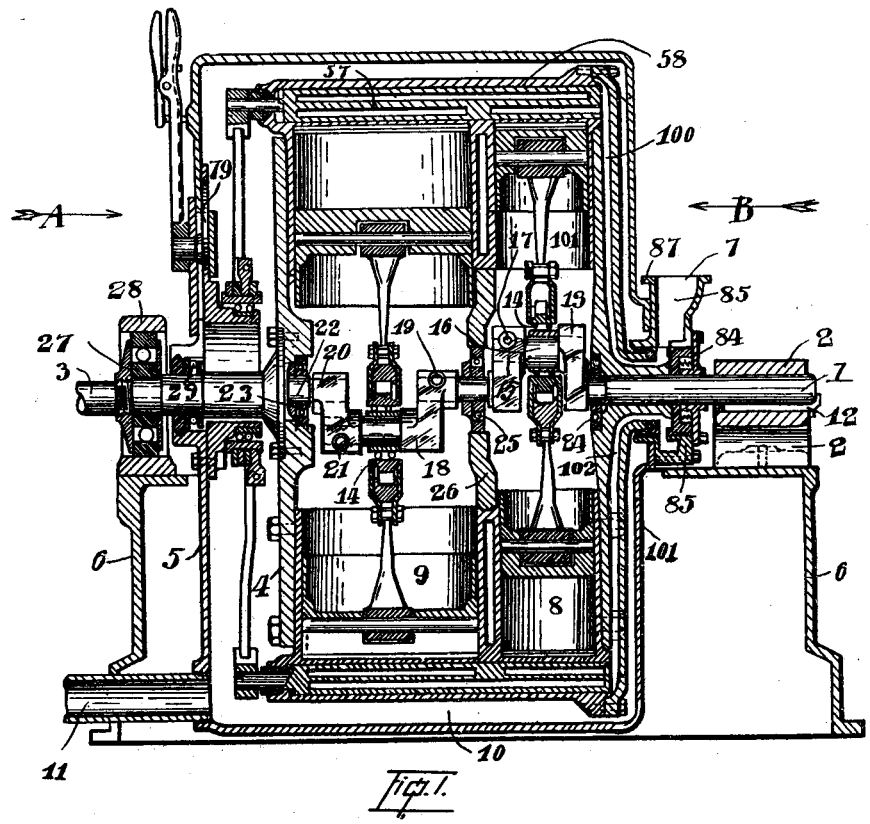

W. E. MINUE.
CONNECTING ROD BEARING FOR ROTATING CYLINDER ENGINES.
APPLICATION FILED JAN. 26, 1914.

1,138,001.

Patented May 4, 1915.
2 SHEETS—SHEET 1.

WITNESSES.

INVENTOR
W. E. MINUE.

ATTYS.

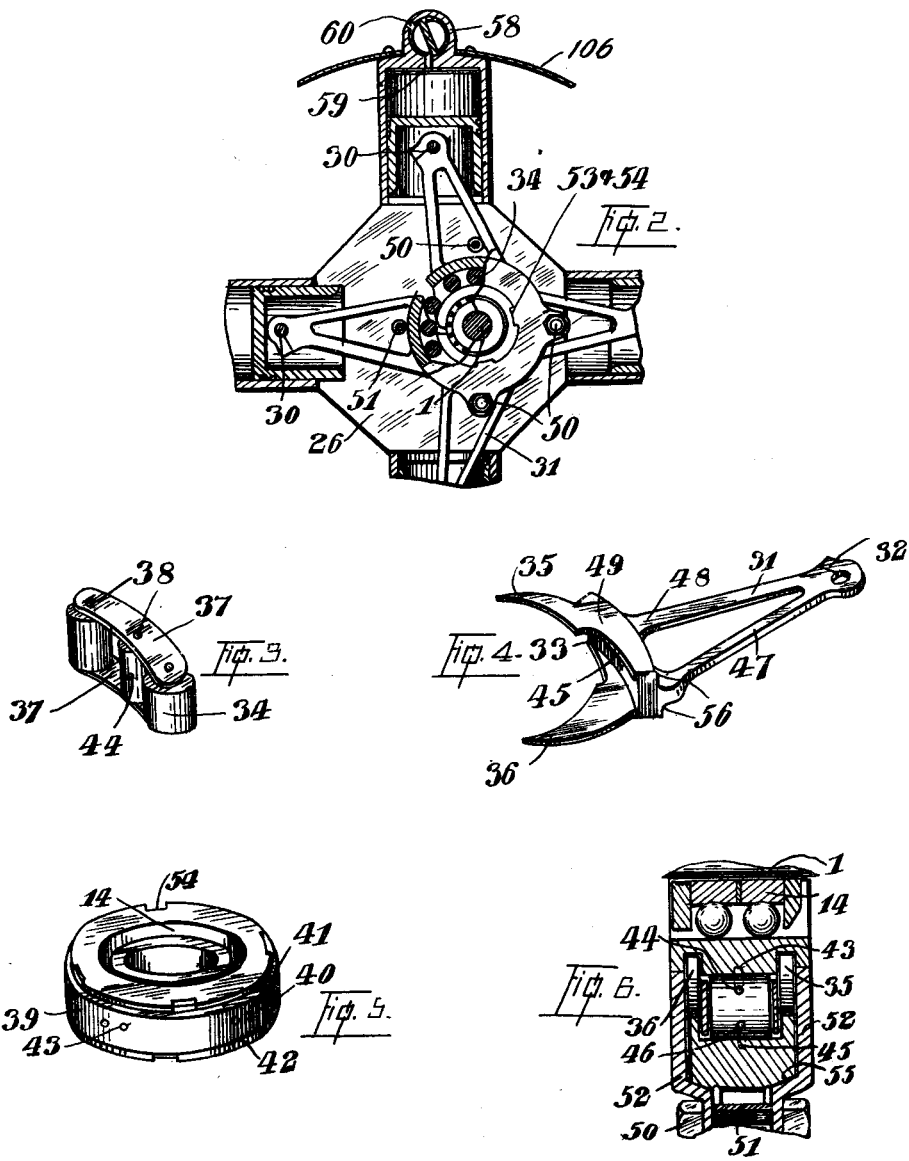

UNITED STATES PATENT OFFICE.

WILLIAM EDGAR MINUE, OF FREDERICTON, NEW BRUNSWICK, CANADA.

CONNECTING-ROD BEARING FOR ROTATING CYLINDER-ENGINES.

1,138,001.  Specification of Letters Patent.  Patented May 4, 1915.

Application filed January 26, 1914. Serial No. 814,571.

*To all whom it may concern:*

Be it known that I, WILLIAM EDGAR MINUE, a subject of the King of Great Britain, architect, residing in the city of Fredericton, Province of New Brunswick, Dominion of Canada, have invented certain new and useful Improvements in Connecting-Rod Bearings for Rotating Cylinder-Engines, of which the following is a specification.

The invention relates to improvements in engines as described in the following specification and the drawings which form part of the same.

The objects of the invention are to simplify the construction of, and also reduce the friction in as well as increasing the efficiency of engines, whether for steam or gas.

The invention consists of the improved and novel construction and arrangement of parts disclosed hereinafter.

The example which I have illustrated in the present specification and drawings showing the adaptation of my invention thereto is a rotary steam engine of the type known as compound, that is having high and low pressure cylinders.

In the drawings, Figure 1 represents a sectional elevation of such an engine. Fig. 2 is a part sectional elevation indicating the arrangement of pistons and connecting rods, the connection between them and the stiff crank. Fig. 3 shows a set of rollers suitable for interposing between the connecting rods and the outer race of the ball bearings secured to the stiff crank. Fig. 4 indicates in perspective the form of connecting rod used in my invention. Fig. 5 indicates the ball race adapted to be used with these connecting rods and rollers. Fig. 6 shows a sectional arrangement in elevation of the ball bearing attached to a stiff crank, also the connecting rod end and claws engaging therewith and the rollers and the housing which secures the connecting rod and rollers to the outer race.

In the drawings like numerals of reference indicate corresponding parts in all the figures.

In accordance with the present invention, and referring more particularly to the example which I herein illustrate and describe, a crank shaft 1 is keyed or otherwise fixedly secured to a pedestal 2 and the operation of the engine is produced by the thrust of the pistons against the cranks of this fixed shaft giving a rotary motion to the casing in which a plurality of cylinders with their valve gear are secured. This casing, in which the cylinders are, is mounted on ball bearings secured at intervals along the fixed crank shaft for the major part of it and at the end of the rotating casing is secured a shaft 3 which is mounted in a journal on the base plate of the machine.

In the embodiment illustrated, the circular casing 4 containing the cylinders is inclosed by a fixed casing 5 mounted on the base 6. The ingoing steam enters the inlet 7, passes through the passageways 100 and 102 to the valve member 57, then through the high pressure cylinders 8 and the low pressure cylinders 9 out into the space 10 between the fixed casing 5 and the rotating casing 4. The steam passes from the valve member into and out of the high and low pressure cylinders through suitable ports in the valve member hereinafter described. The exhaust pipe 11 is secured to this outer casing 5.

Referring to the specific construction detailed in the drawings, the shaft 1 is secured by a key 12 to the pedestal 2 and is formed with a crank 13 adapted to receive the ball bearings 14 of the high pressure connecting rod seating, and for the purpose of fitting these ball bearings it is necessary to make the crank in several pieces, thus the arm 15 of the crank is bored to receive the end 16 of the crank pin on which the connecting rod seating is arranged and is keyed thereto in any suitable manner such as by the bolt 17. 18 is another section of the crank which is secured with the previous section by the bolt 19. 20 is the final section of the crank secured to the section 18 by the bolt 21. This section terminates in the pin 22 to which is secured the inner face of the ball bearings 23, one of the bearings which supports the outer casing 4.

24 indicates another journal ball bearing between the crank shaft 1 and the rotating casing 4 and 25 is also a journal bearing seated intermediate of the high and low pressure cranks, whose inner race is secured to the stiff crank and whose outer race is secured to the plate 26 which is in the nature of a supporting washer bolted to the several inner ends of the cylinders and adapted to give them rigidity and act as a seating for the ball race 25.

27 is a journal ball bearing whose inner race is secured to the rotating shaft 3 and whose outer race is secured in the housing 28 which is fixed to the bed plate 6. 29 is a thrust ball bearing taking up any end thrust there may be.

Referring to the connecting rod details, these are illustrated particularly in Figs. 1, 2, 3, 4, 5 and 6.

30 represents the connecting rod pivot which is secured to the piston of either high or low pressure cylinders, and 31 is the connecting rod which is pivotally secured to the pin 30 and is preferably provided with a bush to engage directly with the said pin and a split head 32 arranged to be tightened on this bush and to tighten the bush if need be.

33 represents (Fig. 4) the surface against which the rollers 34 (Fig. 3) engage on the one side. The connecting rod is provided with two "claws" 35 and 36 respectively right and left handed and between which rollers 34 (which are preferably secured together by the plates 37 and the pins 38) are adapted to be loosely fitted. These rollers engage with the outer circumference 39 of the outer race 40 of the ball bearing 14 secured to the stiff crank shaft. This outer race has annular grooves 41 and 42 which are adapted respectively to receive the claws 35 and 36. It will be understood that the inner ball race being secured to the crank shaft will not revolve and that the outer race will revolve at the same speed as the outer casing, and further that there will be a slight play of the connecting rod ends relatively one to the other against this outer race. The purpose of these rollers is to take up that slight play with as little friction as possible. Owing to the very limited nature of this play it has been found desirable to have the rollers 34 in their casing 38 extend nearly the whole way along the bearing surface 33 of the connecting rod, and it has also been found desirable in order to prevent the rollers leaving their proper place between the outer race and the connecting rod to put some small pegs 43 on the outer race adapted to engage with corresponding holes 44 in the center roller only and also pegs 45 on the bearing surface of the connecting rod which engage with corresponding perforations in the middle roller 46, which are not shown in the drawing except in Fig. 6.

The connecting rod is made with two arms 47 and 48 secured a suitable distance apart at the end of the part 49 adjacent to the crank and the play of the connecting rod against the outer housing is also limited by the bolt 50 and distance tube 51 which passes through the clamp plates 52 and also between the arms 47 and 48 as shown in Fig. 5. These clamp plates 52 are adapted to fit over the outside on the extreme edges of the outer race of the bearing 14 and are provided with tongues 53 engaging in notches 54 in this outer race which prevent the plates from moving on the race. These plates have a tapered surface 55 engaging with a corresponding tapered surface 56 on the connecting rod and in the event of any wearing of the roller taking place the distance tube 51 may be shortened by cutting a portion of the same away and the plates 52 tightened closer together when the tapered surface 55 will take up any slackness between the rollers 34 and the bearing surfaces with which they engage. (See Fig. 6 for the illustration of this.)

The valve gear for the present invention includes the valve member 57 constructed and operated as described completely in my co-pending application Serial No. 773895 filed June 16th, 1913.

84 indicates a plate which is secured to the stiff crank adjacent to the pedestal 2 in any suitable manner such as by being shrunk or driven on or keyed to the crank shaft 1, and to this is bolted the inlet piece 85 which is constructed having a smooth concentric parallel bore 86 and has on its outside at one side the pipe connecting flange 87 which forms the inlet for the steam.

The steam passage 88 is formed a little eccentrically disposed toward the inner concentric bore, the narrow part of the eccentric being on that side remote from the pipe flange 87.

The inlet piece 85 is suitably bolted to the outer casing and has a plate 84 suitably bolted thereto, the inlet piece 85 being formed with a smooth concentric parallel bore 86 having a pipe connecting flange 87 on its outside which forms the inlet for the steam.

What I claim as my invention is:

1. In combination, a crank shaft having a crank, a pair of race rings on the crank formed with annular grooves on the outer ring a connecting rod formed with a surface adapted to receive rollers, rollers on the surface claws at either side of said surface adapted to act as containers for the rollers and engage in the annular grooves in the outer ring of the ball race.

2. In combination, a crank shaft, a pair of race rings thereon, a connecting rod, a frame, rollers mounted in the frame adapted to reduce friction between the connecting rod and the outer ring, means for preventing the lateral motion and limiting the rolling action of said rollers, said means comprising pins projecting from the surfaces which the rollers engage, one of said rollers being provided with orifices adapted to engage with said pins.

3. In combination, a crank shaft, a pair of race rings thereon, a connecting rod having a bearing surface on its inner end extending peripherally of the race rings, rollers between the outer race ring and the bearing surface on the connecting rod and means on each side of the connecting rod extending over the race ring and adapted to prevent lateral movement of the connecting rod.

4. In combination, a connecting rod, a crank shaft, a pair of race rings mounted on said crank shaft the outer of said rings being formed with slots in its outer periphery side plates having flanges, said flanges being adapted to secure said connecting rod when said plates are bolted together, lugs on the inner periphery of said plates, said lugs being adapted to engage with said slots in the outer member of the ball race.

In witness whereof I have hereunto set my hand in the presence of two witnesses.

WILLIAM EDGAR MINUE.

Witnesses:
F. W. BARBOUR,
LEWIS C. THOMPSON.

Copies of this patent may be obtained for five cents each, by addressing the "Commissioner of Patents, Washington, D. C."